Patented Dec. 5, 1950

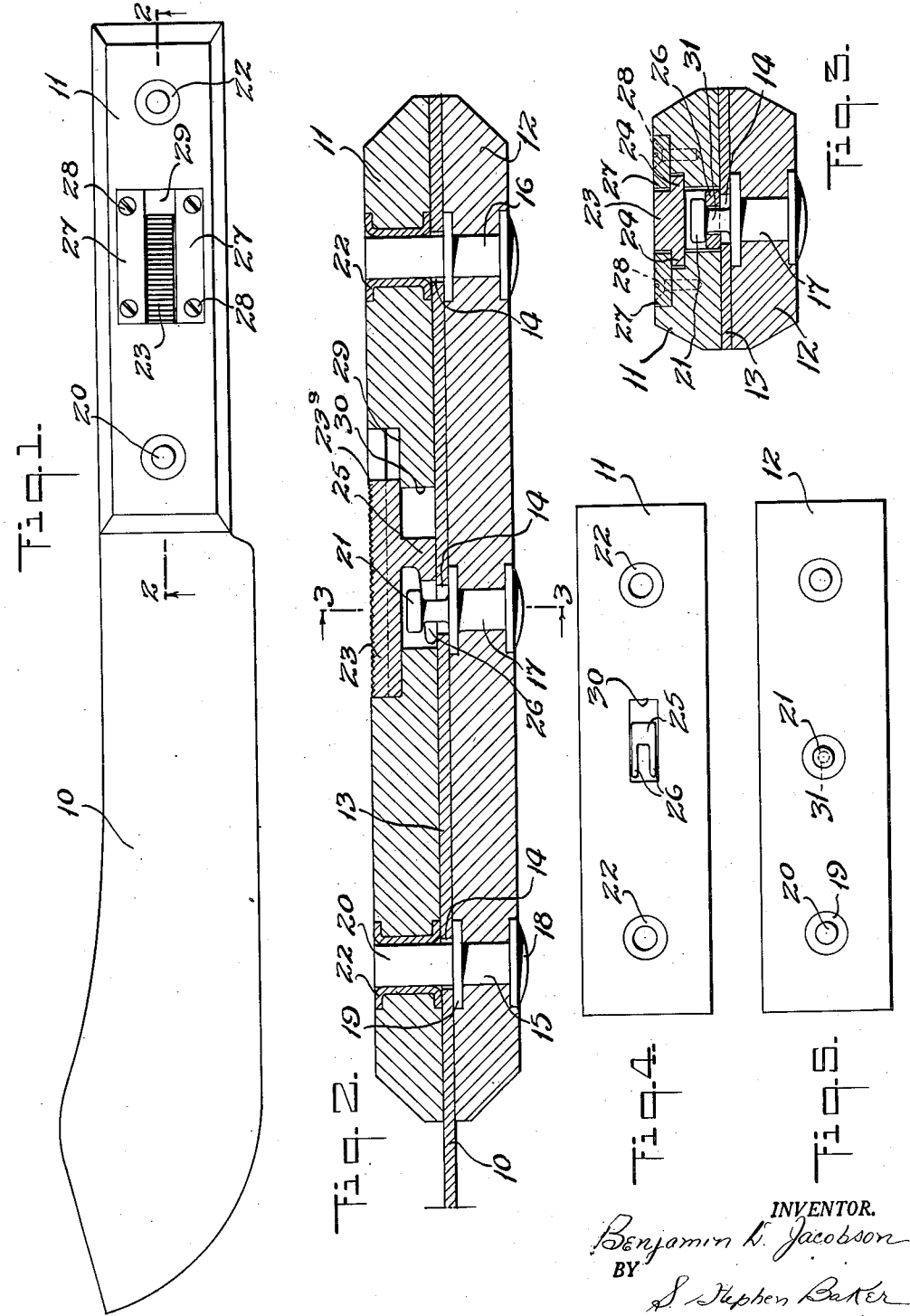

2,533,014

UNITED STATES PATENT OFFICE 2,533,014

REMOVABLE HANDLE FOR KNIVES

Benjamin D. Jacobson, New Brunswick, N. J.

Application July 2, 1949, Serial No. 102,820

7 Claims. (Cl. 30—342)

This invention relates to knives and more particularly to handles therefor which are applied so as to be easily and conveniently removable and replaceable.

This application is particularly concerned with larger types of knives such as used by butchers or in kitchens. It has been my observation that food particles and the like tend to accumulate between the knife handle and the blade, and it is my opinion that cases of food poisoning arising therefrom are not unlikely. The advantage of a knife having removable handles permits all parts of the device to be thoroughly cleaned when taken apart and then reassembled with assurance that the device is clean and sanitary.

I am aware that knives with removable handles have been known in the art. However, the construction and assembly of such knives have been such as to render their use difficult, inconvenient and ineffective. Various disadvantages of such prior structures have prevented them from coming into general use. In the knife as provided by the instant invention, it is believed all such difficulties are substantially eliminated.

According to the instant invention, a knife is provided with a handle which differs only slightly and almost unnoticeably from conventional knives. The handle takes the form of two sections which are inter-secured with the knife blade clamped between them. A simple locking mechanism provides a high degree of clamping force and, as a further feature, such clamping mechanism appears as a countersunk finger piece which is flush with the surface of the handle and appears to the observer as an ornament or the like.

The invention will be further understood from the following description and drawings in which:

Fig. 1 is a side elevational view of a knife provided with the handle structure of the instant invention.

Fig. 2 is a cross sectional, enlarged view as taken along the lines 2—2 of Figure 1.

Fig. 3 is a cross sectional view as taken along the lines 3—3 of Fig. 2.

Fig. 4 is a bottom plan view of one handle section, and

Fig. 5 is a bottom plan view of the opposing handle section.

The article comprises a knife blade 10 which is generally of sturdy form such as may be used in kitchens or by butchers. However, it is evident that any type of knife may be accorded the benefits of the instant invention. The handle comprises two complementary sections 11 and 12 which serve to embrace and firmly clamp the knife blade handle portion 13. Portion 13 is provided with evenly spaced holes 14 in order to receive pins for connecting the handle sections together.

In the assembly of the device handle section 12 is first applied to handle portion 13 of the knife blade 10. Section 12 has secured thereto a plurality of the above-mentioned pins. Thus pins 15, 16 and 17 are secured to section 12 so as not to be displaceable therefrom. Pin 15, for example, is formed with a slightly riveted head 18, a collar 19 and an extending shank 20. In order to permit such disposition of pin 15, it may be formed initially without the enlarged, riveted head 18, and its shank 20 will be inserted through hole 14 until stopped by collar 19. The head 18 is then riveted under so as to secure the pin in place. Pin 16 is secured through the same procedure.

Central pin 17 differs from the end pins in that it is formed with a locking head 21 instead of a simple shank. This head 21 is engaged between elements of the opposing handle section as will be hereinafter set forth.

Handle section 11 is formed with end openings for receiving the shanks of the pins and such end openings are preferably, but not necessarily, provided with metal bushings or linings 22. The central portion of section 11 is cut away at varying levels for receiving a slide locking member 23.

Slide 23 may be of metal or other durable material. It is formed with side flanges 24 as illustrated in Fig. 3 for sliding purposes as will be hereinafter made clear. It is further formed with a depending arm 25 to which is integrally connected the locking yoke 26. It will be observed in Fig. 2 that the arms of locking yoke 26 are inclined, such construction serving as a cam for tightening the engagement thereby with head 21. In order to permit slidable mounting of the slide 23, a pair of runners or ledges 27 are secured at the first level in the cut-out of section 11 as by means of countersunk screws 28. The surface of slide 23 may be knurled as illustrated in order to facilitate manual actuation.

In assembling the above-mentioned components, section 12 is first applied to the underside of the knife blade handle portion or tang 13 so that the pins protrude above such portion. Section 11 is then applied over such pins with the slide 23 in retracted position where its trailing edge 23a rests upon the central level 29 of the cutout. Arm 25 then abuts the wall 30 and the extremities of the yoke arms 26 are slightly behind the neck 31 of central pin 17. The user then actuates slide 23 forwardly so that the yoke arms embrace the neck 31 as illustrated in Fig. 3 and the inclined upper surfaces pull head 21 upwardly so as to firmly secure the handle sections together. This results in both a reliable and attractive clamping connection of the handle sections.

The knife may be used in any conventional manner until it is felt that cleaning is necessary or desirable. At such time the slide 23 is rearwardly actuated so as to release the head 21, permitting the separation of the handle sections and allowing each component part to be separately cleaned. The knife may then be reassembled as desired.

The construction as above described is simple and fool-proof in operation. When the knife is in use, the ledge 29 shields the blade from foreign matter while serving as a rear support for the slide. The countersunk or flush disposition of the slide 23 is useful in preventing accidental actuation of the slide since a positive sliding movement is required for its operation.

The openings 14 are evenly spaced and the end pins are at the same distance from the respective ends of section 12. Accordingly, the handle sections are interchangeable so as to be capable of assembly with a minimum of time or attention.

While there has been shown what at present is considered to be a proved embodiment of the invention, it will be understood that many changes and alterations may be made without departing from its spirit and within the scope of the following claims.

What is claimed is:

1. A knife handle comprising a pair of complementary handle sections for disposition on respective sides of a knife blade handle portion having openings formed therethrough, a plurality of pins projecting from one of said handle sections for entering said openings, a head formed on one of said pins, a head engaging member on the other of said handle sections, said other handle section being formed with pin receiving openings, a slide mounted on said other handle section and connected to said head engaging member so as to effect sliding movement thereof, said sliding movement effecting either engagement or disengagement of said head so as to lock or unlock the handle sections together with a knife blade handle portion maintained between said handle sections, said head engaging member comprising a yoke having open ends for receiving and engaging the underside of said head.

2. An article according to claim 1 and wherein said yoke is formed with cam surfaces for pulling up on said head while locking the handle sections together.

3. A knife handle comprising a pair of complementary handle sections for disposition on respective sides of a knife blade handle portion having openings formed therethrough, a plurality of pins projecting from one of said handle sections for entering said openings, a head formed on one of said pins, a head engaging member on the other of said handle sections, said other handle section being formed with pin receiving openings, a slide mounted on said other handle section and connected to said head engaging member so as to effect sliding movement thereof, said sliding movement effecting either engagement or disengagement of said head so as to lock or unlock the handle sections together with a knife blade handle portion maintained between said handle sections, said other handle section being formed with a central cutout in which said slide is mounted, and a pair of ledges mounted at the sides of said cut-out, said slide being formed with side flanges slidably received below said ledges, said head engaging member depending from the bottom surface of said slide.

4. An article according to claim 3 and wherein said cut-out receives said slide to an extent where its upper surface is flush with the upper surface of said other handle section, said cut-out being formed with at least two levels, said head engaging member being disposed in a lower level, and the remainder of said slide being disposed in an upper level.

5. An article according to claim 4 and including metallic bushings in the pin receiving openings of said other handle section, and flanges formed on said pins at the inner surface of said first-mentioned handle section.

6. A knife comprising a blade having a plurality of spaced openings in the handle thereof and a pair of complementary handle sections intersecured through said openings, a plurality of pins projecting from one of said handle sections for entering said openings, a head formed on one of said pins, a head engaging yoke on the other of said handle sections, said other handle section being formed with pin receiving openings for receiving said pins through the blade openings, and a slide mounted on said other handle section and connected to said yoke for slidably actuating it to head engaging or disengaging position.

7. An article according to claim 6 and wherein the arms of said yoke are cammed to pull up on said head as it is engaged thereby.

BENJAMIN D. JACOBSON.

REFERENCES CITED

The following references are of record in the file of this patent:

UNITED STATES PATENTS

| Number | Name | Date |
| --- | --- | --- |
| 1,202,299 | Lutz | Oct. 24, 1916 |
| 1,993,170 | Havener | Mar. 5, 1935 |